Dec. 13, 1960  F. L. RICHARDSON ET AL  2,964,274
CABLE HANGER
Filed Dec. 30, 1958  3 Sheets-Sheet 1

INVENTORS
FRANKLIN L. RICHARDSON
WILLIAM H. HARMS
BY
ATTORNEYS

Dec. 13, 1960   F. L. RICHARDSON ET AL   2,964,274
CABLE HANGER
Filed Dec. 30, 1958   3 Sheets-Sheet 2

INVENTORS
FRANKLIN L. RICHARDSON
WILLIAM H. HARMS
BY
ATTORNEYS

Dec. 13, 1960  F. L. RICHARDSON ET AL  2,964,274
CABLE HANGER
Filed Dec. 30, 1958  3 Sheets-Sheet 3

INVENTORS
FRANKLIN L. RICHARDSON
WILLIAM H. HARMS
BY
ATTORNEYS

United States Patent Office 2,964,274
Patented Dec. 13, 1960

2,964,274

CABLE HANGER

Franklin L. Richardson, 5887 Four Mile Run Drive N., Arlington, Va., and William H. Harms, Rte. 1, Sterling, Va.

Filed Dec. 30, 1958, Ser. No. 784,005

4 Claims. (Cl. 248—68)

(Granted under Title 35, U.S. Code (1952), sec. 266)

The invention described herein may be manufactured and used by or for the Government of the United States of America for governmental purposes without the payment of any royalties thereon or therefor.

This invention relates to supports and more particularly to hangers for holding conductors on some structure.

Previously, various types of hangers were used to hold conductors, such as cables, pipes, or ducts, on a structure, such as a vehicle, a ship bulkhead or overhead, or other installation. One commonly used hanger consists of a saddle on which the conductors or cables are held by a strap preformed in contour corresponding to the outer periphery of the cables. The saddle is then bolted to the vessel's structure. Such strap hangers are difficult to form since the various contours of each strap differ because the contours of the cables so supported differ, and to snugly clamp the cables to the saddle, each contour must be accurately formed which requires considerable effort and time. This brings about manufacturing problems since each strap must be fabricated in accordance with exact cable measurements and disposition, and most cable arrangements vary considerably throughout the sections of a ship. Hence, it is apparent that many manufacturing steps are involved to provide a variety of straps which are stocked to satisfy the demand, especially since interchangeability of straps is impossible in most instances. In addition, larger and therefore thick straps, are generally formed by die stamping which involves costly die sets and use of heavy presses. One other undesirable feature of strap hangers is that the various members are comparatively heavy and the ultimate result is considerable weight. Such is objectionable and especially so when used with sea-going vessels of any type since excessive weight is always their problem.

Various other methods and means have been utilized to support conductors. One involves the use of clamps to hold individual cables (and in some instances a plurality) to a bracket. Such involves clamps such as U-bolts which hold the particular conductor, such as a pipe, snugly against the rigid support. The deficiency of such a device is it becomes necessary to have a special hanger for each conductor or small group of conductors supported thereby. Hence, the overall result is that a large number of clamps must be used to support the cables, which becomes costly to fabricate and install.

Also, under some conditions, such as heavy shock and impact, the rigid hangers straighten or otherwise change in shape thereby permitting the supported conductors to be released and to chatter. Hence, sturdy and rigid, and therefore heavy, hangers are used which brings about a considerable increase in weight.

Another method which enjoys extensive use is that of supporting a cable or group of cables on a rigid support by passing a band over the cable or cables and bending or clipping the band ends to the support. Such method has various undesired characteristics, one being that the bent or clipped portions of the band are loosened during an impact or shock applied to the conductors, and hence they become dislodged.

Yet another method involves a multi-slotted hanger bracket with a thin metal strap which is woven over a conductor through a slot of the bracket, then over the next conductor or cable, etc. The strap is suitably anchored at each end by slotted bolts or the like that are held to the bracket by lock nuts. Such a structure involves a series of installation steps which are costly and time consuming.

One device which generally enjoys the distinction of overcoming the deficiencies of hangers previously employed is one that uses a flexible clamping member, preferably of band material, that is looped around both the cable or group of cables being supported and the hanger bracket. The looped band may be tensioned by a commercial banding tool and the ends secured as a buckle. One important feature in this construction resides in a cable supporting saddle or bracket member capable of withstanding shock, such as may arise from gun compression or collision of the vessel.

However, several deficiencies arise from the use of this hanger. One is that the structure on which these hangers are supported within the vessel must be positioned in a specific manner to support the brackets. Another is that the bolting ears suspended to the banding hangers fracture under vibration when the bracket is formed of aluminum or when heavily loaded with wire ways or cables supported in the boiler and engine rooms of a vessel.

Therefore, the primary object of the invention is the provision of a hanger having a bracket which may be profitably employed to support conductors, such as conduits or cables, under conditions of shock or impact, and withstands breakage without loss of strength.

In addition, an important object is the provision of a hanger for supporting conductors which is versatile in accommodating a large variety of sizes of conductors and which eliminates the need for large and costly inventories and manufacturing steps but which may be easily attached to a support and installed in diversified positions.

One other object is to provide a hanger with a support bracket which may be supported at a wide variety of locations since it is easily supported without special facilities and which may be mounted in the same plane as the conductors being supported with its longitudinal axis extending normal to them.

A still further object is to provide an easily replaceable hanger that will effect a reduction in weight without a sacrifice in strength but is simple, sturdy, and easily fabricated, and generally less expensive to construct, install and maintain.

Yet another object is to provide a hanger which is sufficiently flexible so that it holds the conductors in position so as to arrest distortion of their arrangement upon shock or impact or other substantial disturbance, and hence is shock resistant.

According to the present invention the cable hanger consists of a bracket and a flexible member which is completely looped around the bracket so as to provide a sturdy, yet resilient, support for conductors, such as cables and other conduits. The bracket (in some embodiments) comprises a tubular member having projecting lugs which may be used to attach the hanger to a support. In other embodiments the tubular bracket is supported on suitable structure provided thereon for that purpose. In all instances the flexible member snugly holds the conduits against a portion or side of the bracket that supports the conductors transverse to the longitudinal axis of the tube and which has extensions or lips that are rounded or curled over which the flexible band passes.

The hollow portion of the tubular bracket provides an aperture through which the flexible band may pass. Such a tubular bracket affords a strong and rugged bracket for the hanger which is highly resistant to fracture under vibrations, shock, and impact conditions it is normally subjected to.

Other objects and many of the attendant advantages of this invention will be readily appreciated as the same becomes better understood by reference to the following detailed description when considered in connection with the accompanying drawings wherein.

Figure 1:
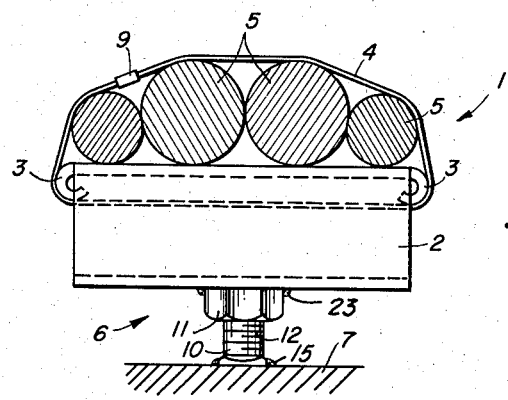
Fig. 1 shows a side view of one embodiment of the hanger having its bracket supported by one embodiment of a support.
Figure 2:
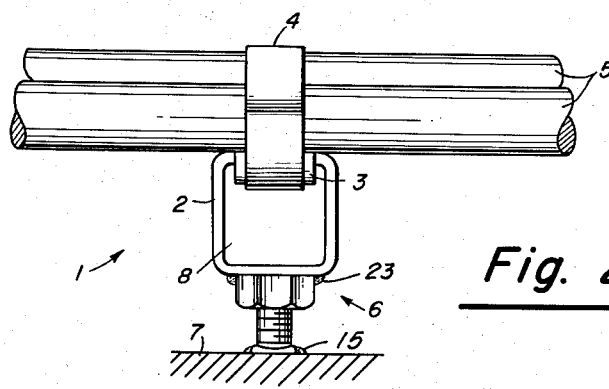
Fig. 2 shows an end view of the embodiment of Fig. 1.

Referring to the drawings, particularly Figs. 1 and 2, one embodiment of the invention may be seen which shows the basic structure. Hanger 1 consists of a tubular member or bracket 2 having curled lugs 3 on either end and a flexible banding strap 4 for holding conductors, indicated by numeral 5, on the bracket. These conductors, either singly or together, form what is generally referred to as a cable run which may extend throughout many areas of a ship or building and which, when any particular vibration or concussion can be anticipated, must be most firmly and securely held. A support, generally indicated by numeral 6, is provided to attach the tubular bracket to a stationary support 7.

The vital feature of this invention lies in the tubular bracket member 2, which is constructed to absorb the heavy shocks and impacts applied to the banding member. All embodiments of the invention employ a tubular member having a rectangular or square cross section, or other suitable shape, having a hollow interior thereby providing a passage 8 (Fig. 2) for the strap member 4 to pass. The bracket is made of suitable stock, such as aluminum or sheet metal.

The particular cross-sectional area of the tubular member and its length is based on the maximum cable load the hanger will satisfactorily carry under high impact and shock. This may be determined experimentally. When the cross-sectional area has relatively sharp interior corners, these corners should be rounded to avoid sharp turns of the metal bracket and thus prevent sharp bends in the metal from effecting ruptures upon shock or impact.

One important feature of the invention lies in the use of a flexible banding strap 4 which places the conductors or cables under compression. The band may be looped over the cables and bracket and tensioned simply by a commercially available banding tool and the ends tied in a suitable buckle 9. The complete wrap-around of the flexible member prevents impact and shock from dislodging the conductors being supported. One other important feature of the invention is that the flexible member be wrapped rather than merely spot welded, bolted, bent over as lugs or ears, etc., otherwise the lugs become loose too easily, and their installation becomes too time consuming.

Another important feature springing from the use of a flexible band strap 4 lies in its flexible characteristics. When some strapping, such as a steel flexible strap is used, a sufficiently rigid, but yet yieldable, hanger is provided which withstands heavy shocks and impacts. Experience indicates that it is best to use a plurality of loops (Fig. 4) of the band, such as two, around the cable and bracket and this provides a sturdy but yet yieldable conductor holder.

Another somewhat important feature of the invention lies in the particular manner in which the bracket is supported on a stationary supporting structure. Fig. 1 shows one embodiment of such a supporting structure, namely stud structure 6, which is made up of a stud 10 and nut 11 fabricated of any suitable material such as sheet steel, stud 10 being secured to support 7 by a weld 15. Nut 11 is projection welded by a weld 23 to the bracket member and since it is internally threaded, is attached to the stud structure by suitable threads 12 provided thereon.

Figure 3:
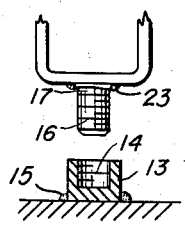
Fig. 3 shows a modified support for the hanger.

A modified embodiment of the stud structure is shown in Fig. 3 wherein a collar 13 is secured to some suitable structure preferably by a well 15. Such collar has threads provided therein, shown at 14, which may be employed to engage threads 16 of a stud 17 welded as shown or otherwise suitably supported, on the bracket shown therewith.

Figure 4:
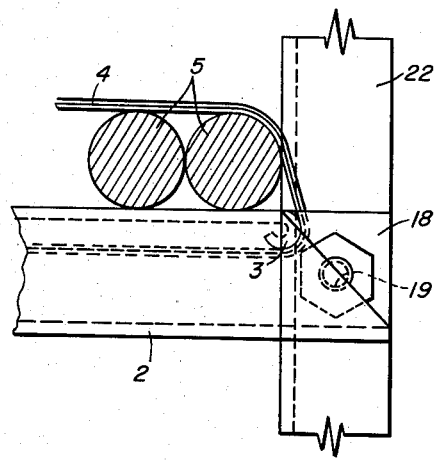
Fig. 4 shows a side view of another hanger assembly showing a modified bracket for supporting the hanger.
Figure 5:
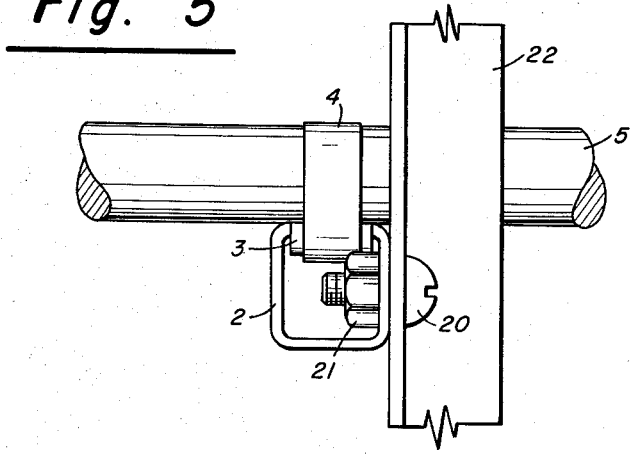
Fig. 5 shows an end view of the hanger of Fig. 4.

The modified embodiment shown in Figs. 4 and 5 shows a still different manner of supporting the bracket on suitable structure. In this instance a lug or ear 18 is provided on the bracket member 2 which has a suitable aperture 19 therein shown in Fig. 4, and through which a bolt 20 is inserted to which nut 21 is attached to secure the bracket on suitable angle structure 22. As shown in Figs. 4 and 5, the rolled or curled lips 3 used on the bracket described in respect to Figs. 1 and 2 is also used in this particular embodiment.

Figure 6:
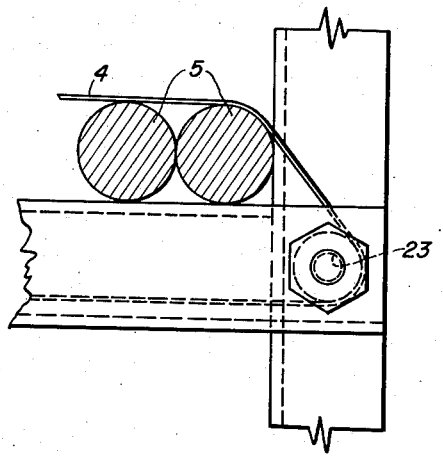
Fig. 6 shows a side view of still another modification for supporting the bracket and a flexible binding member.
Figure 7:
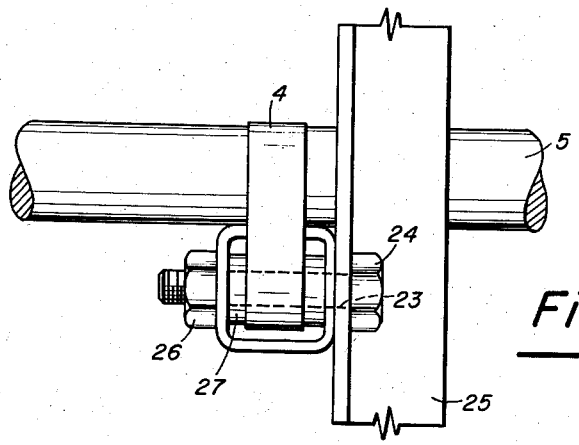
Fig. 7 shows an end view of the embodiment of Fig. 6.

Still another embodiment of the invention is shown in Figs. 6 and 7 wherein an aperture 23 is provided through two sides of the bracket and at each end, and a bolt 24 passes therethrough which is secured to a supporting bracket 25 by a nut 26. In place of the curled lips 3 shown in the other embodiments, a spacer support 27 is positioned on the interior of the bracket and carried by bolt 24. The spacer preferably is circular and may be conveniently used to protect the strap holder 4 from sharp bends and injury during times of heavy impact or shock. Hence, the spacer acts as a reinforcement and as a protector for the banding straps.

As now should be apparent, the hanger bracket is easily fabricated from suitable tubular stock and thus is economical and affords few manufacturing problems. The strap or banding material used to hold the conductors or cables on the bracket provides a simple but sturdy hanger which is sufficiently flexible so that upon shock or impact it holds the cables in position so as to arrest distortion of their arrangement but which rigidly supports the cables. Since the hanger is easily supported as indicated by the various embodiments shown in this disclosure it may be supported at a wide variety of locations without special brackets or other heretofore required structure. Although the hanger is easily fabricated, inexpensive to manufacture, and generally easier to install and maintain, it has proven itself to be sturdy and strong and resistant to breakage even under heavy impact or shock. In addition, this hanger may be used in a wide variety of locations and under varying conditions to accommodate a wide variety of cable sizes.

The lugs or ears 3 are rolled or curled and act as resilient cushions for the strapping material that passes thereover. The curvature afforded the strapping material at these points prevents fracture of the looped band and thereby increases the life and strength of the hanger. In one embodiment, however, a circular collar is used for this latter purpose which also acts as a spacer between apertured sides of the bracket, which is bolted to some structure. The bracket is tubular and hence its hollow interior affords a passage for the strap or banding material thereby lessening fabrication steps.

Obviously many modifications and variations are possible in light of the above teachings. It is therefore to be understood that within the scope of the subject matter being claimed, that this invention may be practiced otherwise than as specifically described herein.

What is claimed is:

1. A hanger for compressively banding and supporting a cable run, said hanger comprising an elongate planar metal tubular member of uniform rectilinear cross section throughout its length, said member being adapted to extend transversely to the axis of said cable run and having one of its external planar side wall surfaces adapted to supportably engage cables of the run, said side wall having a length approximately equal to the combined diameters of laterally-adjacent cables of the run, a length of continuously flat unpreformed flexible metal band extending axially through said tubular member and completely encircling said run, band clamping means for securing together the ends of said band length, said clamping means being formed to permit tensioning of the band about the cable run whereby said band is drawn into continuous engagement with the interior surface of said side wall and said cable run is compressively bound to its said external surface, and partable hanger attachment means having one of its parts carried by another side wall of said tubular member, and another of its parts adapted to be integrally secured to external hanger supporting structure.

2. The hanger of claim 1 wherein said metal band encircles said cable run and threads through said tubular member a plural number of times.

3. The hanger of claim 1 wherein said tubular member side wall has rolled end portions for minimizing band breakage.

4. The hanger of claim 1 wherein said attachment means includes nut and bolt members, one of said members being integrally carried on the external surface of the side wall of the rectilinear tubular member that is diametrically opposite to the cable-supporting side wall.

References Cited in the file of this patent

UNITED STATES PATENTS

| 928,711 | Taft | July 20, 1909 |
| 2,502,714 | Garnett | Apr. 4, 1950 |

FOREIGN PATENTS

| 514,959 | Canada | July 26, 1955 |